No. 36,980. PATENTED NOV. 18, 1862.
T. W. IRVIN.
GRAIN SEPARATOR.

3 SHEETS—SHEET 1.

No. 36,980. PATENTED NOV. 18, 1862.
T. W. IRVIN.
GRAIN SEPARATOR.

3 SHEETS—SHEET 2.

Witnesses,

Inventor.

No. 36,980.

PATENTED NOV. 18, 1862.

T. W. IRVIN.
GRAIN SEPARATOR.

3 SHEETS—SHEET 3.

Witnesses,

Inventor,
Thomas W. Irvin

UNITED STATES PATENT OFFICE.

THOMAS W. IRVIN, OF MARION COUNTY, INDIANA, ASSIGNOR TO WILLIAM C. HOLMES AND EDWARD DUNN, OF SAME PLACE.

IMPROVEMENT IN GRAIN-SEPARATORS.

Specification forming part of Letters Patent No. 36,980, dated November 18, 1862.

*To all whom it may concern:*

Be it known that I, THOMAS W. IRVIN, of Marion county, State of Indiana, have invented new and useful improvements on suction-tubes for cleaning and separating wheat and other small grain; and I do hereby declare that the following is a full, clear, and exact description of the construction and operation of the same, reference being had to the annexed drawings, making a part of this specification, in which—

Figure 1:
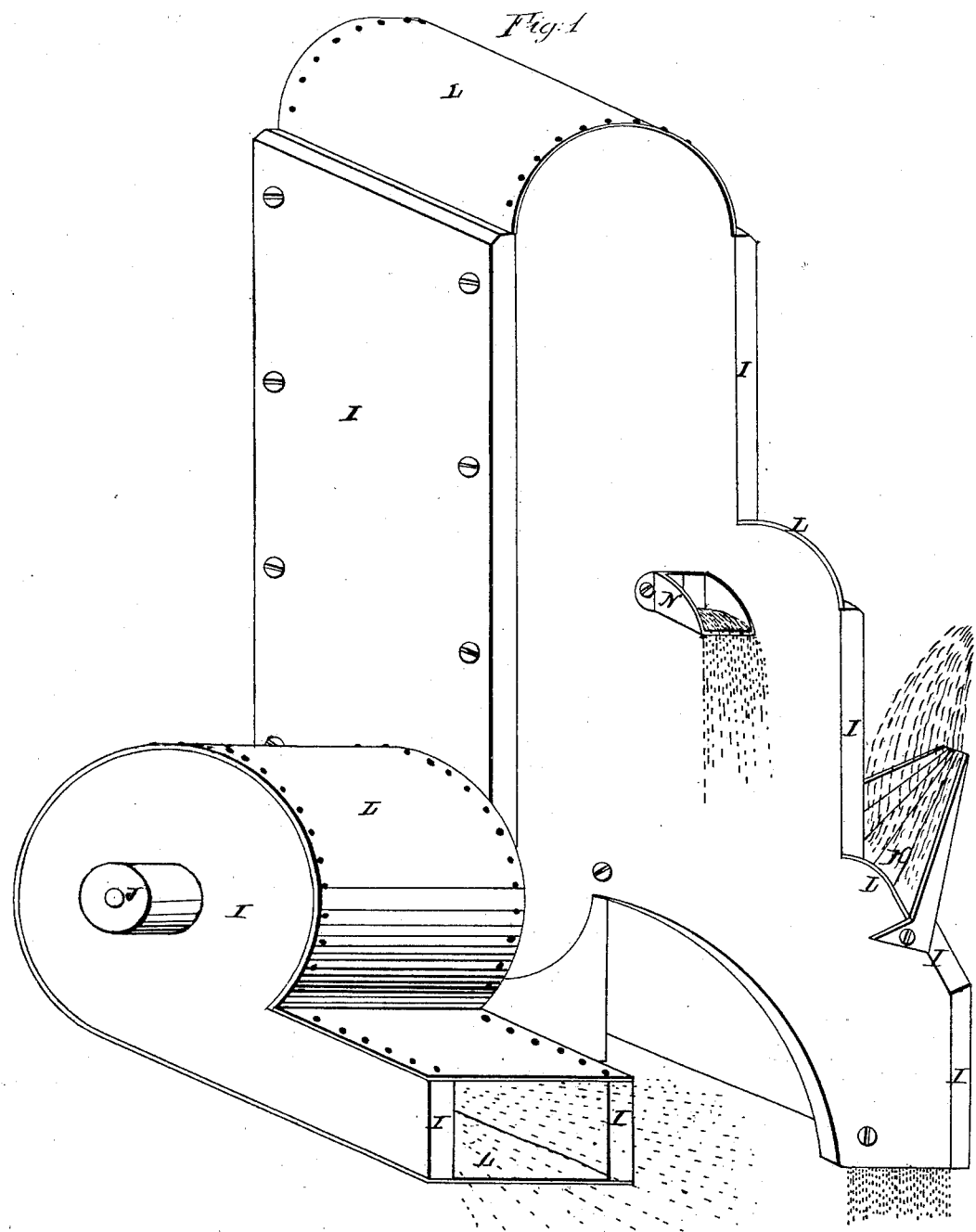
Figure 2:
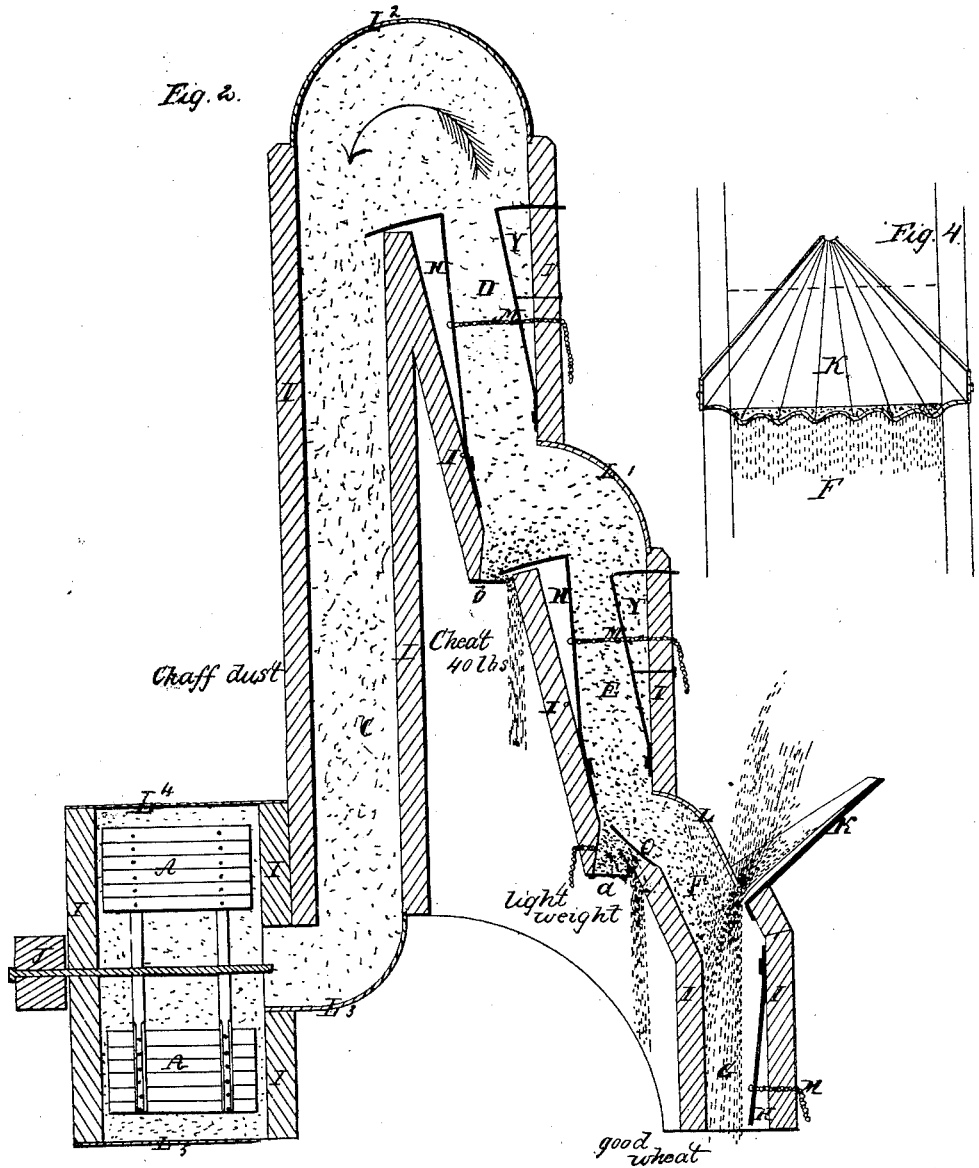
Figure 3:
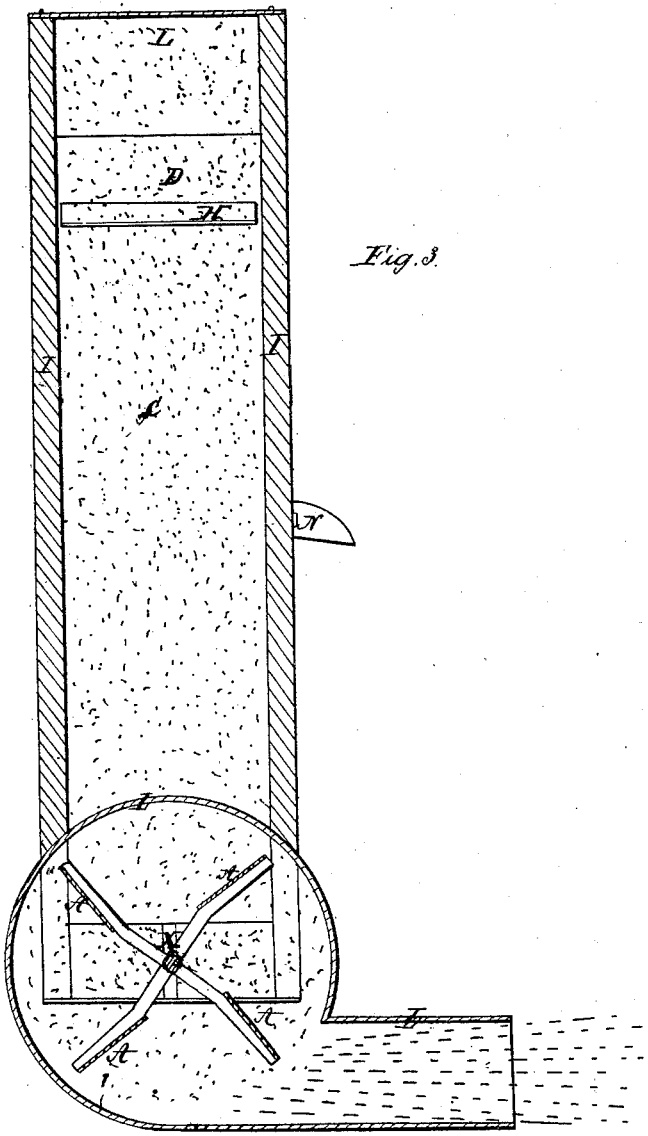

Figure 1 is a perspective view of a suction-tube with my improvements; Fig. 2, a section of the same; Fig. 3, a cross-section, and Fig. 4 a view of the corrugated hopper.

My invention consists in using a diverging corrugated hopper, K, to insert the grain into the suction-tube F. The corrugations of the hopper extend clear across the entire hopper, which has the same width as the tube. The corrugations run lengthwise, thereby spreading the wheat clear across the tube F and exposing the wheat to a cross-draft of the wind entering the tube G. I form an angle in tube F for the purpose of throwing the wheat in the center of the tube, and thereby increasing the facilities of cleaning the wheat. Valve H serves as a regulator of the ingress of air into the tube. Valve O prevents a too large accumulation of grain at the lower valve, $a$, which valve $a$ will open and close at intervals, owing to the weight of grain upon it. The second quality of wheat, "light wheat," passes through these valves $O^\times a$, while the good wheat drops through the tube G.

L represents a curved metal covering of the upper part of tube F. The cheat passes up the tube E, in which tube another valve, H, regulates the draft of air. The cheat will settle on valve $b$ and drop through it, and the chaff and dust will pass up through tube D and down through tube C into the fan-house and out.

In tube D is another valve, H, for regulating the draft.

$L'$, $L^2$, and $L^3$ represent metal covers in the tube.

$L^4$ and $L^5$ represent the metal inclosure of the fan-house.

A A represent the fan, and J the pulley.

I I I and $c$ represent the sides of the tube.

M M M represent the cords to set the valves.

N represents the spout for the discharge of the wheat from tube E, valve C.

X represents the inside bearing of the fan improvement.

For the purpose of throwing the wheat into the sides I° I°, I change the valves H in tube E, and the valve H in tube D, from where they are shown on drawing No. 2, and place them on the opposite sides I 1 of tubes E and D. By this change the draft is facilitated, and the wheat slides better upon the valves $a$ and $b$.

The valves $g$, changed, are marked "red" and figured Y Y on drawing No. 2.

Operation: The fan A creates a draft through the entire tube. By letting the wheat into the angular tube F by means of a corrugated hopper, K, the draft is compelled to pass through it crosswise, throwing out the lighter parts of wheat of about fifty pounds, and all the dust, chaff, and cheat. The light wheat in passing up the tube F settles on valve $a$ and passes through it and valve O, while the good wheat drops through tube G. The cheat, chaff, and dust pass on through tube E and deposit the cheat on valve $c$ and the spout N. The chaff and dust pass through tubes C and D, and from there into the fan-house and out.

What I claim as my invention, and desire to secure by Letters Patent, is—

The combination of the corrugated hopper K with the angular tube F E D and valves H H O $a$ and $b$, all arranged and operating substantially as and for the purpose shown and described.

THOMAS W. IRVIN.

Witnesses:
N. P. HOLMES,
J. M. L. SMITHMYER.